United States Patent
Watanabe

(10) Patent No.: US 9,989,930 B2
(45) Date of Patent: Jun. 5, 2018

(54) MOBILE ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventor: Kouji Watanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/305,440

(22) PCT Filed: Apr. 24, 2015

(86) PCT No.: PCT/JP2015/062614
§ 371 (c)(1),
(2) Date: Oct. 20, 2016

(87) PCT Pub. No.: WO2015/163474
PCT Pub. Date: Oct. 29, 2015

(65) Prior Publication Data
US 2017/0038741 A1    Feb. 9, 2017

(30) Foreign Application Priority Data
Apr. 24, 2014   (JP) .................. 2014-090377

(51) Int. Cl.
*G08B 1/00* (2006.01)
*G04G 13/02* (2006.01)
(Continued)

(52) U.S. Cl.
CPC ........... *G04G 13/021* (2013.01); *G04G 13/02* (2013.01); *G08B 3/10* (2013.01); *H04M 1/72569* (2013.01);
(Continued)

(58) Field of Classification Search
CPC ........ G04G 13/021; G04G 13/02; G08B 3/10; H04M 1/72569; H04M 1/72566; H04W 4/027
(Continued)

(56) References Cited

U.S. PATENT DOCUMENTS 7,656,275 B2 * 2/2010 Marui .................. G06F 3/0481
                                                340/309.16
7,671,756 B2 * 3/2010 Herz ....................... G06F 3/017
                                                340/539.1
(Continued)

FOREIGN PATENT DOCUMENTS

JP    2007-309809 A    11/2007
JP    2008-271453 A    11/2008
(Continued)

OTHER PUBLICATIONS

International Search Report in PCT/JP2015/062614, dated Jul. 7, 2015.
(Continued)

*Primary Examiner* — Eric M Blount
(74) *Attorney, Agent, or Firm* — Hauptman Ham, LLP

(57) ABSTRACT

A mobile electronic device according to one embodiment includes a sounding module that performs alarm sounding and a controller that determines whether the mobile electronic device is in a moving state. When it is determined that the mobile electronic device is in the moving state, the controller disables the alarm sounding by the sounding module.

4 Claims, 4 Drawing Sheets

(51) Int. Cl.
*G08B 3/10* (2006.01)
*H04W 4/02* (2018.01)
*H04M 1/725* (2006.01)

(52) U.S. Cl.
CPC ........ *H04W 4/027* (2013.01); *H04M 1/72566* (2013.01)

(58) Field of Classification Search
USPC .................................................... 340/309.16
See application file for complete search history.

(56) References Cited

U.S. PATENT DOCUMENTS

| | | | | |
|---|---|---|---|---|
| 9,152,131 | B2 * | 10/2015 | Mokhnatkina | G04G 13/02 |
| 9,310,779 | B2 * | 4/2016 | Huh | G04G 13/021 |
| 9,335,742 | B2 * | 5/2016 | Jeong | G04G 13/023 |
| 2006/0017692 | A1 * | 1/2006 | Wehrenberg | G06F 1/1616 |
| | | | | 345/156 |
| 2006/0077763 | A1 * | 4/2006 | Saukkonen | G04G 11/00 |
| | | | | 368/28 |
| 2008/0102807 | A1 * | 5/2008 | Lee | H04L 12/66 |
| | | | | 455/418 |
| 2009/0153323 | A1 * | 6/2009 | Nielsen | G04G 13/021 |
| | | | | 340/540 |
| 2010/0128571 | A1 * | 5/2010 | Roh | G04G 13/021 |
| | | | | 368/11 |
| 2011/0074558 | A1 * | 3/2011 | Miura | G04G 13/021 |
| | | | | 340/309.16 |
| 2014/0253319 | A1 * | 9/2014 | Chang | H04M 1/72522 |
| | | | | 340/521 |
| 2014/0253320 | A1 * | 9/2014 | Bender | H04M 1/72566 |
| | | | | 340/521 |
| 2014/0313020 | A1 | 10/2014 | Miura | |
| 2015/0245117 | A1 | 8/2015 | Chiba | |

FOREIGN PATENT DOCUMENTS

| | | |
|---|---|---|
| JP | 2010114642 A | 5/2010 |
| JP | 2014045457 A | 3/2014 |
| WO | 2009119777 A1 | 10/2009 |

OTHER PUBLICATIONS

Office Action in JP Application No. 2014-090377 dated Jan. 9, 2018, for which an explanation of relevance is attached, 4pp.

* cited by examiner

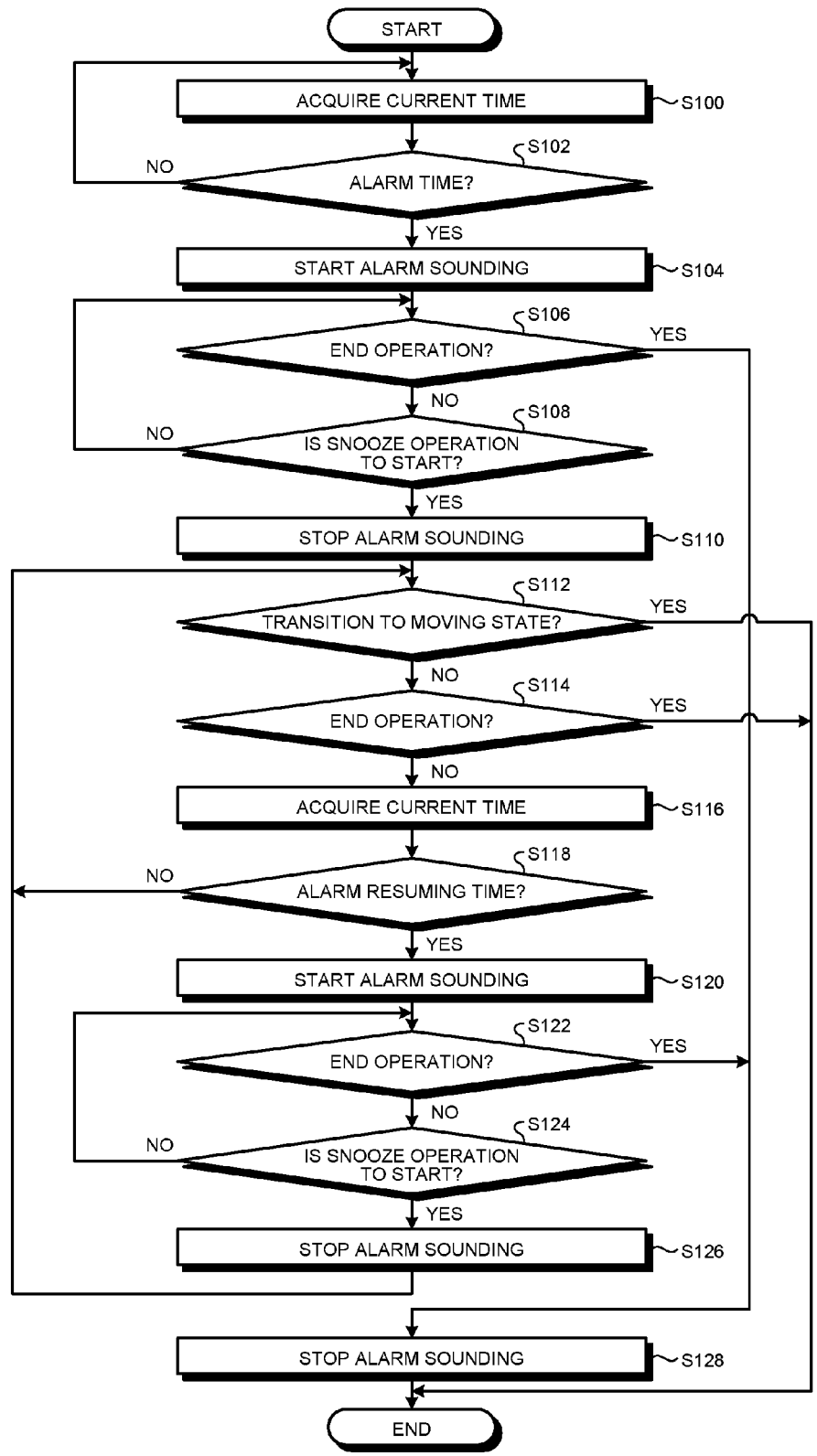

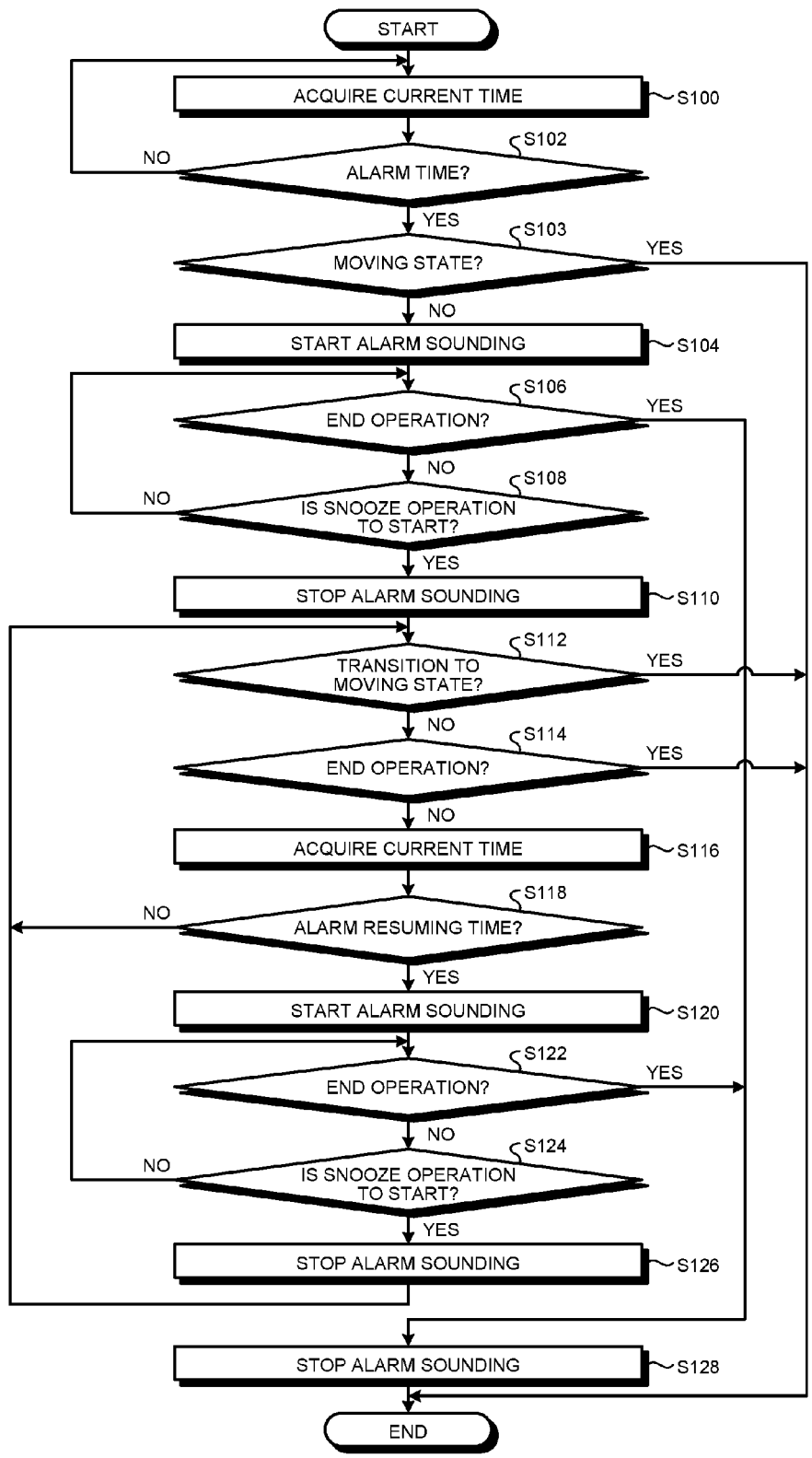

MOBILE ELECTRONIC DEVICE, CONTROL METHOD, AND NON-TRANSITORY STORAGE MEDIUM

CROSS-REFERENCE TO RELATED APPLICATION

The present application is a National Phase entry of International Application No. PCT/JP2015/062614, filed Apr. 24, 2015, which claims priority of Japanese Application No. 2014-090377, filed Apr. 24, 2014, the entire contents of which are incorporated herein by reference.

FIELD

The present application relates to a mobile electronic device, a control method, and a non-transitory storage medium.

BACKGROUND

A mobile electronic device has had an alarm sounding function.

SUMMARY

In one aspect, a mobile electronic device includes:
a speaker performing alarm sounding; and
a controller determining whether the mobile electronic device is in a moving state,
when it is determined that the mobile electronic device is in the moving state, the controller disabling the alarm sounding by the speaker.
In one aspect, a control method for a mobile electronic device includes the steps of:
performing alarm sounding by a speaker;
determining whether the mobile electronic device is in a moving state; and
when it is determined that the mobile electronic device is in the moving state, disabling the alarm sounding by the speaker.

BRIEF DESCRIPTION OF THE DRAWINGS

FIG. 3 is a flowchart of an example of an operation about an alarm function.
FIG. 4 is a flowchart of another example of the operation about the alarm function.

DETAILED DESCRIPTION

There is room for improvement in control about the alarm sounding function that the mobile electronic device has.

The following describes an example of embodiments of a mobile electronic device in detail with reference to the accompanying drawings. Examples of the mobile electronic device include, but are not limited to, smartphones, mobile phones, tablets, mobile personal computers, digital cameras, media players, electronic book readers, navigators, game machines, etc.

Figure 1:
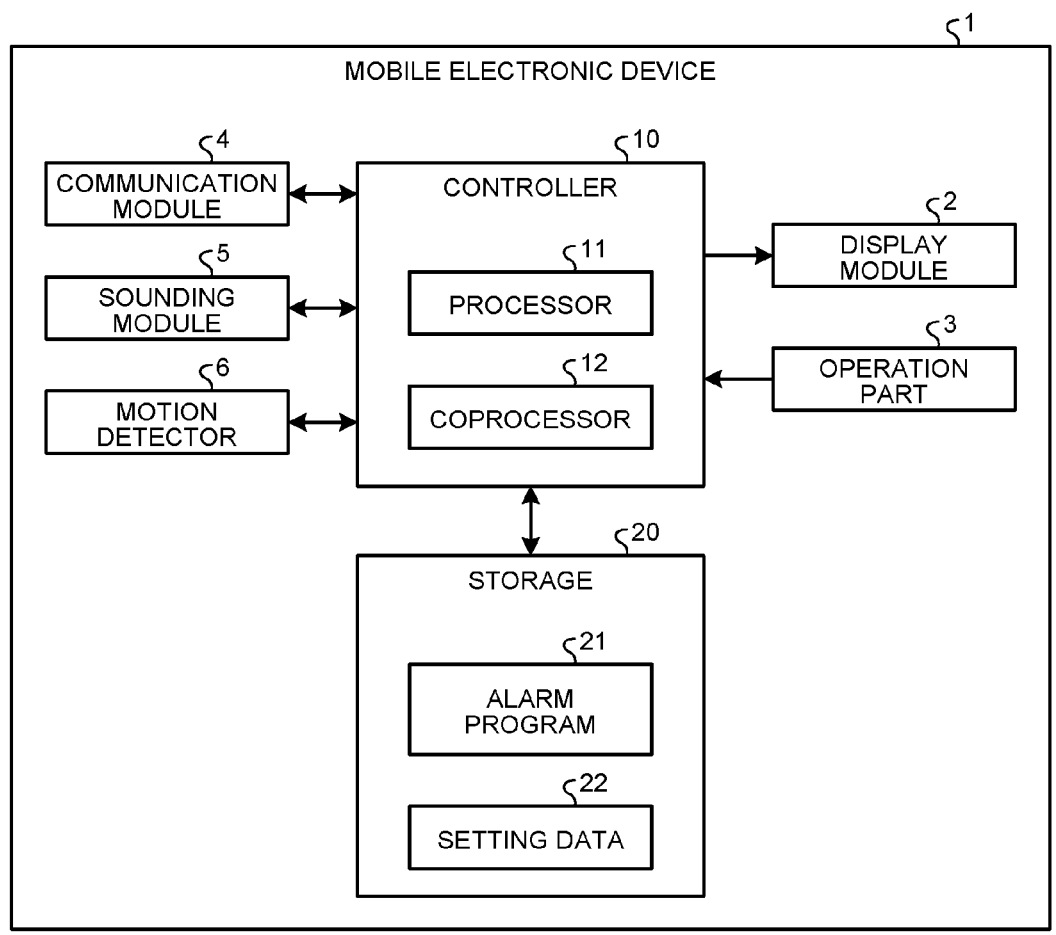
FIG. 1 is a block diagram of a mobile electronic device.

FIG. 1 is a block diagram of a mobile electronic device 1 according to the example of embodiments. The mobile electronic device 1 includes a display module 2, an operation part 3, a communication module 4, a sounding module 5, a motion detector 6, a controller 10, and a storage 20, The display module 2 includes a display device such as a liquid crystal display, an organic electro-luminescence display, or an inorganic electro-luminescence display. The display module 2 displays a screen containing letters, images, symbols, figures, and the like using the display device.

The operation part 3 receives operations by a user. The operation part 3 includes buttons, keyboards, dials, levers, and touch screens (touch sensors), for example. The operation part 3 may receive operations in a noncontact manner such as sound or light. The operation part 3 may support a plurality of operation manners.

The whole or part of the operation part 3 may be integral with the display module 2. A touch screen that detects contact as the operation part 3 may be provided integrally with the display module 2, for example. The mobile electronic device 1 provided with the touch screen as the operation part 3 can detect gestures performed on the display module 2 by the user using a finger or the like via the touch screen.

The communication module 4 enables wireless data communication. The communication module 4 supports either or both of wireless communication in a relatively wide area such as 3G or 4G that communication carriers provide and wireless communication in a relatively short range such as WiFi (registered trademark) or Bluetooth (registered trademark). The communication module 4 may support voice communication.

The sounding module 5 notifies the user by producing sounds. The sounding module 5 may produce sounds by reproducing sound data such as ringtone data and music data. The sounding module 5 may produce sounds by vibrating part or the whole of the mobile electronic device 1 based on vibration pattern data.

The motion detector 6 detects the motion of the mobile electronic device 1 in a three-dimensional space. The motion detector 6 can detect changes in the position of the mobile electronic device 1 and changes in the attitude of the mobile electronic device 1, for example. The motion detector 6 includes various sensors such as an acceleration sensor, a gyroscope, an orientation sensor, and an atmospheric pressure sensor in order to detect the motion of the mobile electronic device 1. The mobile electronic device 1 can acquire the frequency, the amplitude, and the like of the vibrations of the mobile electronic device 1 caused by external forces, for example, using the motion detector 6.

The controller 10 controls the mobile electronic device 1. The controller 10 includes a processor 11 and a coprocessor 12. The processor 11 and the coprocessor 12 are processing units. Examples of the processing units include, but are not limited to, central processing units (CPUs), system-on-a-chip (SoC), micro control units (MCUs), field-programmable gate arrays (FPGAs), etc.

The processor 11 executes various kinds of instructions stored in the storage 20, thereby implementing the various kinds of functions of the mobile electronic device 1. Specifically, the processor 11 executes instructions contained in storage 20 while referring to data and the results of processing acquired from the modules of the mobile electronic device 1, thereby executing various kinds of control.

The coprocessor 12 can operate as usual even when the processor 11 stops or reduces its processing speed. The coprocessor 12 can be used for the acquisition and analysis of the detection values of the various kinds of sensors, the execution of processing corresponding to analysis results, or the like, for example.

The storage 20 stores therein instructions and data. The storage 20 can be used as a work area that temporarily stores therein the processing results of the controller 10. The storage 20 may include a semiconductor storage medium and any non-transitory storage medium such as a magnetic storage medium. The storage 20 may include a plurality of kinds of storage media. The storage 20 may include a combination of a portable storage medium such as a memory card, an optical disc, or a magneto-optical disc and a reading device for the storage medium. The storage 20 may include a storage device used as a temporary storage area such as a random access memory (RAM).

The storage 20 stores therein an alarm program 21 and setting data 22, for example. The alarm program 21 provides an alarm function that notifies the user using the sounding module 5. The notification by the alarm function is executed when a rising time set in advance has arrived, when the starting time of a registered schedule has arrived, or the like, for example.

The alarm function that the alarm program 21 provides includes a snooze function. The snooze function is a function that renotifies the user of the notification executed by the controller 10 through the alarm function after a lapse of a certain time. The renotification through the snooze function is performed when the user performs an interruption operation to temporarily interrupt the notification executed by the controller 10 through the alarm function. The renotification through the snooze function is executed also when the user has not performed, in response to a notification, any of the interruption operation and an end operation to end the notification within a certain period.

The alarm function that the alarm program 21 provides includes a function that determines whether the mobile electronic device 1 is in a moving state and, when it is determined that the mobile electronic device 1 is in the moving state, disables notification. The determination about whether the mobile electronic device 1 is in the moving state is performed based on the fluctuation pattern of the magnitude of acceleration that the acceleration sensor of the motion detector 6 detects, for example.

The alarm program 21 may be introduced via communication by the communication module 4 or a non-transitory storage medium.

The setting data 22 stores therein various kinds of information for determining the operation of the mobile electronic device 1. The information stored in the setting data 22 includes sound data, vibration pattern data, time data, and moving pattern data, for example. The sound data is used to cause the sounding module 5 to generate sounds. The vibration pattern data is used by the controller 10 to cause the sounding module 5 to generate vibrations. The time data is used by the controller 10 to refer to a time at which the notification through the alarm function is started. The moving pattern data is used by the controller 10 to determine whether the mobile electronic device 1 is in the moving state.

The setting data 22 may be acquired from another device via communication by the communication module 4.

Figure 2:
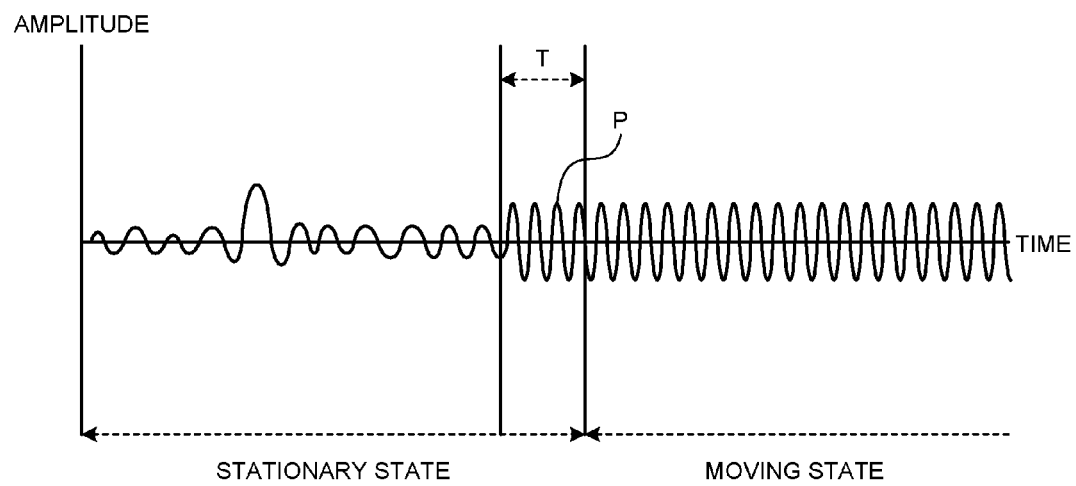
FIG. 2 is a diagram of an example of the determination of a moving state.

With reference to FIG. 2, the following describes the determination of the moving state in the alarm function. FIG. 2 is a diagram of an example of the determination of the moving state. In FIG. 2, the horizontal axis indicates time, whereas the vertical axis indicates the magnitude of the acceleration detected by the acceleration sensor of the motion detector 6 as amplitude.

When a state in which the fluctuations of the magnitude of the acceleration detected by the acceleration sensor of the motion detector 6 are within a minute range continues for a certain period, the mobile electronic device 1 determines that the mobile electronic device 1 is in a stationary state. The minute range is the range of fluctuations caused by a noise component contained in the output of the acceleration sensor, for example.

The stationary state is a state in which the mobile electronic device 1 is left at rest at a stable place. After determining that the mobile electronic device 1 is in the stationary state, the mobile electronic device 1 maintains the determination that the mobile electronic device 1 is in the stationary state until fluctuation pattern data P on the magnitude of acceleration in a certain period T matches moving pattern data stored in advance. The moving pattern data is prepared for each means of movement of the user such as a pattern while walking, a pattern while running, a pattern while riding on a bicycle, a pattern while riding in a car, or a pattern while riding in a train.

When a period in which the fluctuation pattern data of the magnitude of acceleration matches the preset moving pattern data continues for the certain period T in the stationary state, the mobile electronic device 1 determines that the mobile electronic device 1 is in the moving state. The moving state of the mobile electronic device 1 is a state in which the mobile electronic device 1 is held by the user on the move. In other words, the moving state of the mobile electronic device 1 corresponds to the various kinds of means of movement of the user.

From the foregoing, when the period in which the fluctuation pattern data of the magnitude of acceleration matches the moving pattern data stored in advance does not continue for the certain period T, the mobile electronic device 1 maintains the determination that the mobile electronic device 1 is in the stationary state. For this reason, even when the detected fluctuations of the magnitude of acceleration temporarily increase by some impact or the like, the mobile electronic device 1 less erroneously determines that the mobile electronic device 1 has made a transition to the moving state.

When thus determining that the mobile electronic device 1 is in the moving state, the mobile electronic device 1 disables the notification through the alarm function (hereinafter, this notification may be referred to as "alarm sounding") using the sounding module 5. Disabling the alarm sounding may be the reservation of the alarm sounding. In this case, when the mobile electronic device 1 has made a transition from the moving state to the stationary state, the mobile electronic device 1 resumes the alarm sounding. Disabling the alarm sounding may be the cancellation of the alarm sounding. In this case, even when the mobile electronic device 1 has made a transition from the moving state to the stationary state, the mobile electronic device 1 does not resume the alarm sounding.

When determining that the mobile electronic device 1 is in the moving state, the mobile electronic device 1 can disable the alarm sounding, and thus, an operation through which the user cancels the alarm sounding can be omitted. Further, when determining that the mobile electronic device 1 is in the moving state, the mobile electronic device 1 disables the alarm sounding, and thus, when the user rides in means of public transportation, surrounding people are less given a feeling of displeasure.

FIG. 2 describes an example in which the mobile electronic device 1 determines the moving state based on the fluctuation pattern data of the magnitude of the acceleration detected by the acceleration sensor of the motion detector 6. However, the mobile electronic device 1 may determine the moving state using another sensor in place of the acceleration sensor or in addition to the acceleration sensor.

With reference to FIGS. 3 and 4, the following describes the operation of the mobile electronic device 1 in more detail. FIG. 3 is a flowchart of an example of an operation about the alarm function of the mobile electronic device 1. The operation illustrated in FIG. 3 is implemented by causing the controller 10 of the mobile electronic device 1 to execute the alarm program 21.

As illustrated in FIG. 3, the controller 10 acquires a current time at Step S100. The controller 10 determines whether an alarm time at which the alarm sounding is performed has arrived at Step S102. When the alarm time has not arrived (No at Step S102), the controller 10 returns to Step S100.

When the alarm time has arrived (Yes at Step S102), the controller 10 proceeds to Step S104. The controller 10 starts the alarm sounding at Step S104. After that, the controller 10 determines whether an end operation has been detected at Step S106. When the end operation has been detected (Yes at Step S106), the controller 10 proceeds to Step S128. The controller 10 stops the alarm sounding at Step S128.

When the end operation has not been detected (No at Step S106), the controller 10 proceeds to Step S108. The controller 10 determines whether a snooze operation is to start at Step S108. The snooze operation is an operation that suspends the alarm sounding and resumes the alarm sounding after a lapse of the period of suspension. When the interruption operation is detected, or when neither the interruption operation nor the end operation has been detected during a certain period, the controller 10 determines that the snooze operation is to start. When it is not determined that the snooze operation is to start (No at Step S108), the controller 10 returns to Step S106.

When it is determined that the snooze operation is to start (Yes at Step S108), the controller 10 proceeds to Step S110. The controller 10 stops the alarm sounding at Step S110. Thus, as illustrated at Step S112 to Step S126, the controller 10 starts the snooze operation.

The controller 10 determines whether a transition to the moving state has been detected at Step S112. When the transition to the moving state has been detected (Yes at Step S112), the controller 10 ends the snooze operation. With this operation, the controller 10 disables the alarm sounding. When a transition from the moving state to the stationary state has been detected, the controller 10 may resume the snooze operation.

When the transition to the moving state has not been detected (No at Step S112), the controller 10 proceeds to Step S114. The controller 10 determines whether an end operation has been detected at Step S114. When the end operation has been detected (Yes at Step S114), the controller 10 ends the snooze operation.

When the end operation has not been detected (No at Step S114), the controller 10 proceeds to Step S116. The controller 10 acquires a current time at Step S116. The controller 10 determines whether an alarm resuming time at which the alarm sounding is resumed has arrived at Step S118. When the alarm resuming time has not arrived (No at Step S118), the controller 10 returns to Step S112.

When the alarm resuming time has arrived (Yes at Step S118), the controller 10 proceeds to Step S120. The controller 10 starts the alarm sounding at Step S120. After that, the controller 10 determines whether an end operation has been detected at Step S122. When the end operation has been detected (Yes at Step S122), the controller 10 proceeds to Step S128. The controller 10 stops the alarm sounding at Step S128 to end the snooze operation.

When the end operation has not been detected (No at Step S122), the controller 10 proceeds to Step S124. The controller 10 determines whether the snooze operation is to start afresh at Step S124. When it is not determined that the snooze operation is to start afresh (No at Step S124), the controller 10 returns to Step S122.

When it is determined that the snooze operation is to start afresh (Yes at Step S124), the controller 10 proceeds to Step S126. The controller 10 stops the alarm sounding at Step S126. After that, the controller 10 returns to Step S112.

FIG. 3 describes an example in which the mobile electronic device 1 disables the alarm sounding through the snooze function when the transition to the moving state has been detected. However, when determining the moving state, the mobile electronic device 1 may disable not only the alarm sounding through the snooze function but also initial alarm sounding performed before the snooze function is operated.

With reference to FIG. 4, the following describes an example of an operation that disables the initial alarm sounding through the alarm function. FIG. 4 is a flowchart of another example of the operation about the alarm function of the mobile electronic device 1. The operation illustrated in FIG. 4 is implemented by causing the controller 10 of the mobile electronic device 1 to execute the alarm program 21.

In FIG. 4, steps similar to those of FIG. 3 are denoted by the same step numbers as those of FIG. 3. When disabling the initial alarm sounding through the alarm function, the controller 10 determines whether the mobile electronic device 1 is in the moving state at Step S103.

When the mobile electronic device 1 is not in the moving state (No at Step S103), the controller 10 proceeds to Step S104. The controller 10 starts the alarm sounding at Step S104. The subsequent operation is similar to that of FIG. 3. In contrast, when the mobile electronic device 1 is in the moving state (Yes at Step S103), the controller 10 disables the alarm sounding.

Embodiments that the present application discloses can be modified without departing from the essence and the scope of the invention. Further, embodiments and modifications thereof that the present application discloses can be appropriately combined.

The instruction illustrated in FIG. 1 may be divided into a plurality of modules or combined with another instruction, for example.

In order to disclose the techniques according to the accompanying claims completely and clearly, characteristic embodiments have been described. However, the accompanying claims should not be limited to embodiments and should be configured to embody all modifications and alternative configurations that those skilled in the art can create within the scope of the basic matters disclosed in the present specification.

The invention claimed is:
1. A mobile electronic device, comprising:
a speaker configured to perform alarm sounding; and
a controller configured to determine whether the mobile electronic device is in a moving state,
wherein, in a situation where a snooze function that suspends the alarm sounding after initial alarm sound- ing by the speaker and resumes the alarm sounding after a lapse of a period of suspension is set, in response to a determination that the mobile electronic device has shifted to the moving state, the controller is configured to disable the initial alarm sounding by the speaker before execution of the snooze function, and wherein, in response to a determination that the mobile electronic device has made a transition from the moving state to a stationary state, the controller is configured to resume the alarm sounding.

2. The mobile electronic device according to claim 1, wherein the controller is configured to cause the speaker to start the initial alarm sounding in response to a determination that the mobile electronic device is not in the moving state.

3. The mobile electronic device according to claim 1, wherein the controller is configured to disable the alarm sounding by cancelling the alarm sounding.

4. A control method for a mobile electronic device, the mobile electronic device having a speaker configured to perform alarm sounding, the control method comprising:

determining whether the mobile electronic device is in a moving state;

in a situation where a snooze function that suspends the alarm sounding after initial alarm sounding by the speaker and resumes the alarm sounding after a lapse of a period of suspension is set, in response to a determination that the mobile electronic device has shifted to the moving state, disabling the initial alarm sounding by the speaker before execution of the snooze function; and in response to a determination that the mobile electronic device has made a transition from the moving state to a stationary state, resuming the alarm sounding.

* * * * *